(12) United States Patent
Nowottnick

(10) Patent No.: US 8,069,350 B2
(45) Date of Patent: Nov. 29, 2011

(54) COMMUNICATION PROTOCOL AND ELECTRONIC COMMUNICATION SYSTEM, IN PARTICULAR AUTHENTICATION CONTROL SYSTEM, AS WELL AS CORRESPONDING METHOD

(75) Inventor: Juergen Nowottnick, Hamburg (DE)

(73) Assignee: NXP B.V., Eindhoven (NL)

( * ) Notice: Subject to any disclaimer, the term of this patent is extended or adjusted under 35 U.S.C. 154(b) by 1051 days.

(21) Appl. No.: 11/914,226

(22) PCT Filed: May 4, 2006

(86) PCT No.: PCT/IB2006/051405
§ 371 (c)(1),
(2), (4) Date: Nov. 12, 2007

(87) PCT Pub. No.: WO2006/120617
PCT Pub. Date: Nov. 16, 2006

(65) Prior Publication Data
US 2008/0270793 A1   Oct. 30, 2008

(30) Foreign Application Priority Data
May 11, 2005  (EP) ..................................... 05103939

(51) Int. Cl.
*H04L 9/32* (2006.01)

(52) U.S. Cl. .......... 713/168; 713/169; 713/170; 380/44; 380/28

(58) Field of Classification Search .......................... None
See application file for complete search history.

(56) References Cited

U.S. PATENT DOCUMENTS

| | | | |
|---|---|---|---|
| 7,231,521 B2 * | 6/2007 | Buddhikot et al. | 713/171 |
| 7,325,134 B2 * | 1/2008 | Fascenda | 713/169 |
| 7,600,118 B2 * | 10/2009 | Lee et al. | 713/168 |
| 2004/0049678 A1 | 3/2004 | Walsmley et al. | |
| 2004/0202317 A1 | 10/2004 | Demjanenko et al. | |
| 2005/0144468 A1 * | 6/2005 | Northcutt et al. | 713/189 |

FOREIGN PATENT DOCUMENTS

| | | | |
|---|---|---|---|
| DE | EP 1 526 677 A1 * | 10/2004 | |
| EP | 1492305 A2 | 12/2004 | |
| EP | 1526677 A1 | 4/2005 | |

* cited by examiner

*Primary Examiner* — Nasser Moazzami
*Assistant Examiner* — Fikremariam A Yalew

(57) ABSTRACT

In order to provide a communication protocol for cryptographic authentication on the basis of at least one cryptographic algorithm, in particular according to the A[dvanced]E[ncryption]S[tandard], by
  providing at least one random number (PRN') for at least one first, in particular present, authentication sequence or authentication session (n), and
  providing at least one further random number (PRN2, PRN3) for at least one further, in particular second or next, authentication sequence or authentication session (n+1),
wherein the relevant time for cryptographic authentication is shortened, it is proposed that providing the further random number (PRN2, PRN3) is initialized (p) when, in particular immediately after, successfully performing the authentication in the first authentication sequence or authentication session (n).

10 Claims, 6 Drawing Sheets

FIG. 3-I
FIG. 3-II

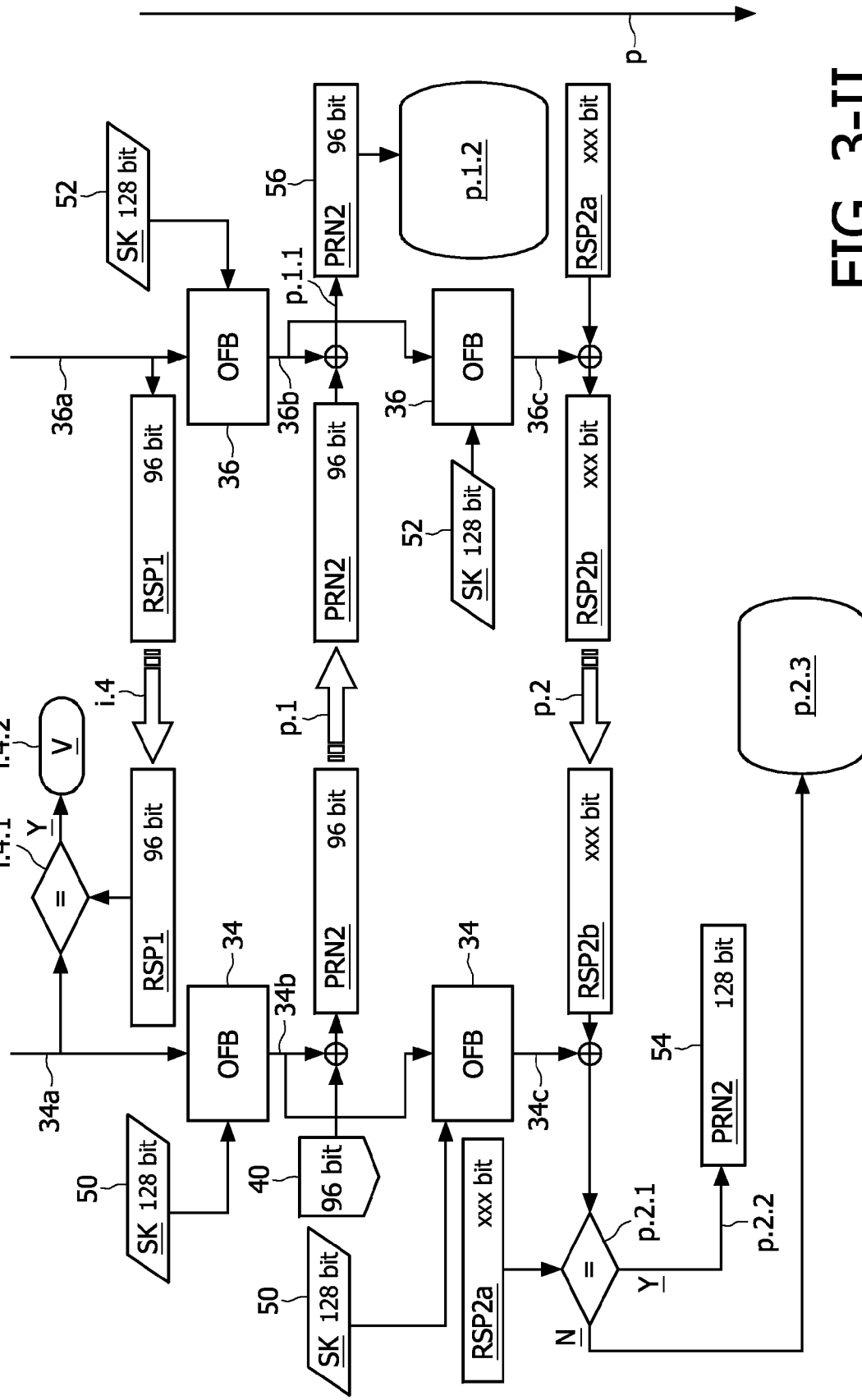

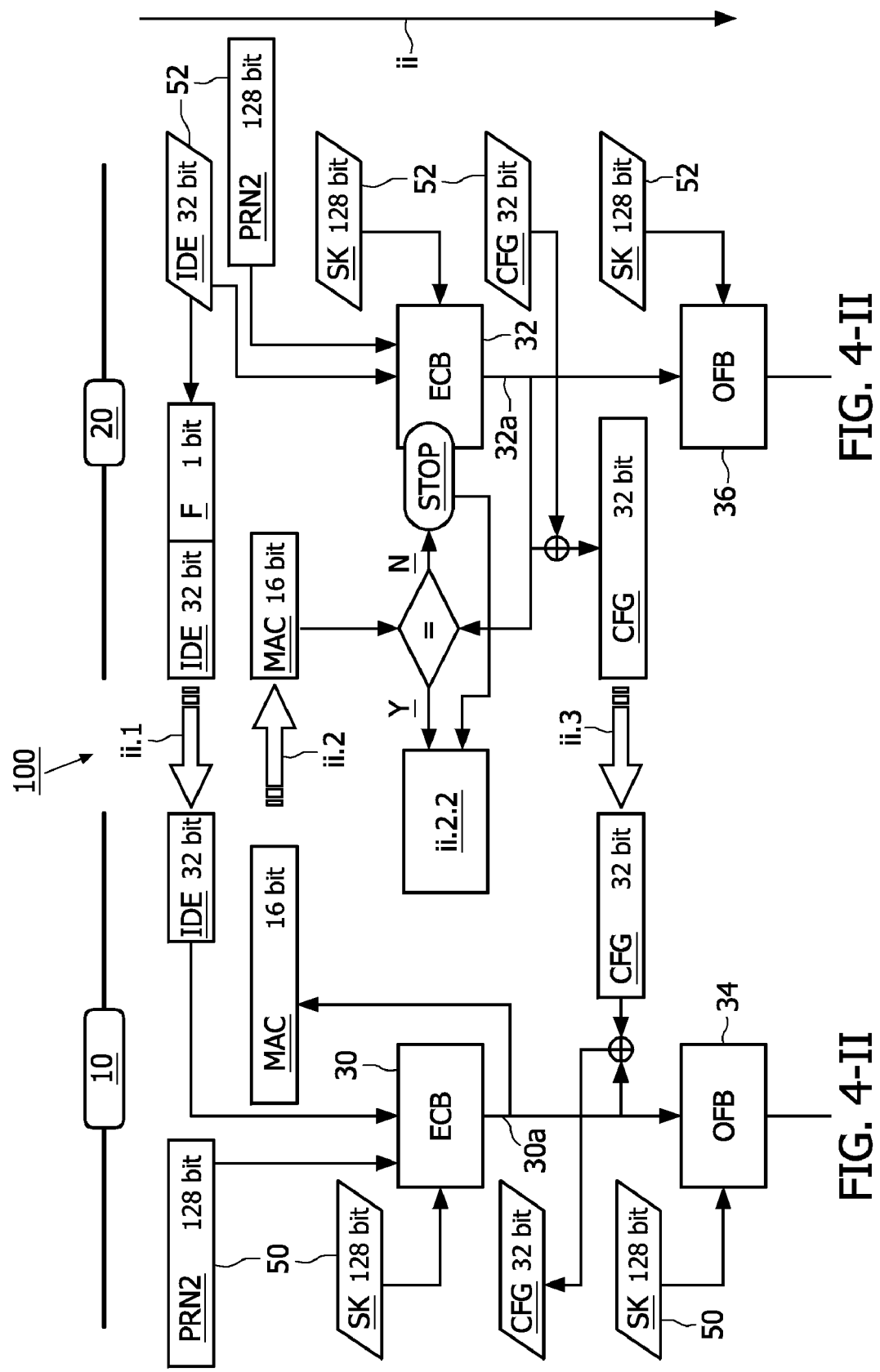
FIG. 4-I
FIG. 4-II

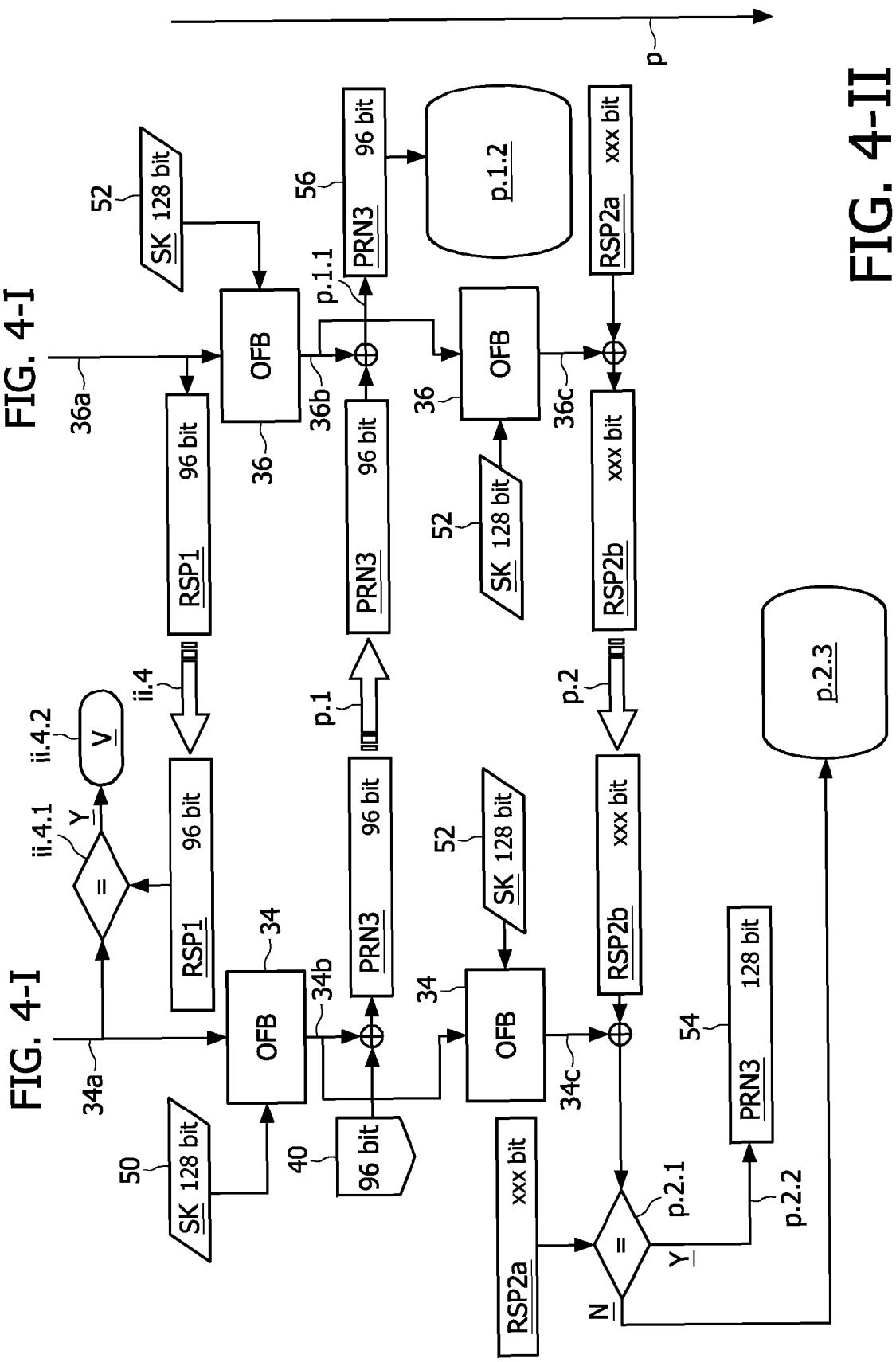

COMMUNICATION PROTOCOL AND ELECTRONIC COMMUNICATION SYSTEM, IN PARTICULAR AUTHENTICATION CONTROL SYSTEM, AS WELL AS CORRESPONDING METHOD

The present invention relates in general to the technical field of security systems and/or of access systems, as used for example in the area of means of transport and in this case above all in the area of access systems for motor vehicles.

Specifically, the present invention relates to a communication protocol as detailed in the preamble of claim 1, to an electronic communication system as detailed in the preamble of claim 2, as well as to a method of cryptographic authentication on the basis of at least one cryptographic algorithm as detailed in the preamble of claim 4.

Figure 2:
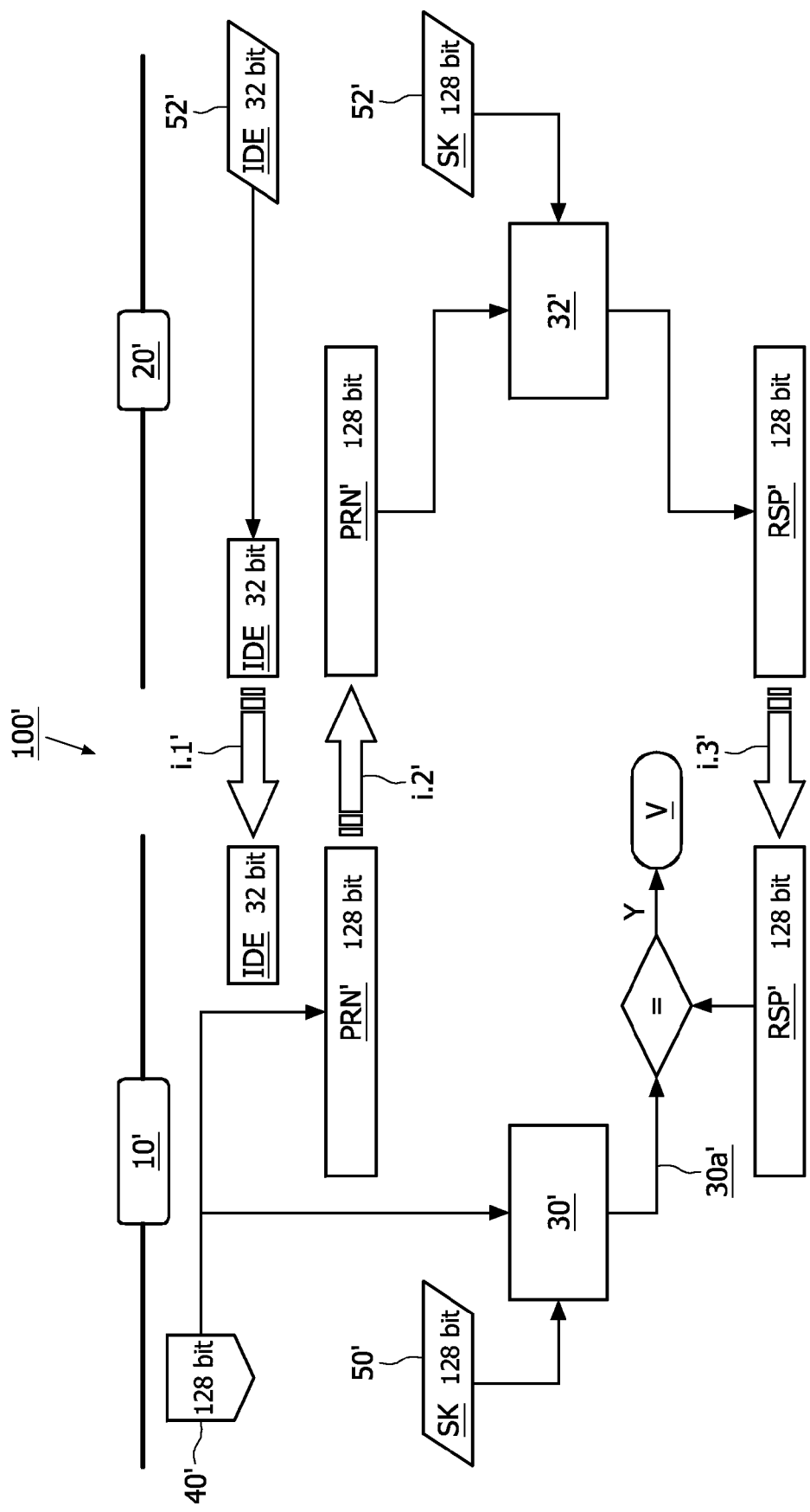

An example for an immobilizer authentication process based on a standard cipher 30', 32' with a 128-bit key, namely based on the A[dvanced]E[ncryption]S[tandard] 128 crypto algorithm, is depicted in FIG. 2 (regarding the technical background of AES128, reference can for example be made to prior art document US 2004/0202317 A1).

In FIG. 2, a base station 10' being arranged on or in an object to be secured against unauthorized use and/or against unauthorized access, for example being arranged on or in a vehicle, and a remote device 20', in particular a key, are exchanging data signals 12, 22, wherein by means of the exchanged data signals 12, 22 the authentication for use and/or for access can be determined. The base station 10' and the remote device 20' belong to an authentication system 100'.

The authentication system 100' comprises an electrically erasable and programmable read-only-memory (EEPROM) 50', 52' being designed for generating
- at least one identifier number IDE, in particular at least one serial number, preferably on 32-bit basis, and/or
- at least one secret key SK, preferably on 128-bit basis.

For authentication said identifier number IDE is transmitted from the remote device 20' to the base station 10' in a first authentication stage or first authentication step i.1' by an up-link.

Thereupon, at least one 128-bit pseudo random number PRN' is transmitted from the base station 10' to the remote device 20' in a second authentication stage or second authentication step i.2' by a down-link. This pseudo random number PRN' has been generated by at least one pseudo random number generator 40' arranged at the base station 10'.

In the base station 10' as well as in the remote device 20' at least one respective cipher unit 30', 32' is provided; this respective cipher unit 30', 32' is operated by AES128 based on electronic codebook mode (so-called ECB mode). The respective cipher unit 30', 32' is provided with the pseudo random number PRN' as well as with the secret key SK.

After encryption/decryption of the pseudo random number PRN' with the secret key SK, a 128-bit response RSP' is transmitted from the remote device 20' to the base station 10' in a third authentication stage or third authentication step i.3' by an up-link; this 128-bit response RSP' has been generated by the cipher unit 32' of the remote device 20'.

Thereupon the base station 10' checks the authenticity or validity of the 128-bit response RSP' by comparing this 128-bit response RSP' with the output 30a' of the cipher unit 30' of the base station 10'. If the 128-bit response RSP' equals (=reference numeral Y in FIG. 2) the output 30a' of the cipher unit 30', then the authentication process is valid (=reference numeral V in FIG. 2).

The most relevant drawback of this implementation as shown in FIG. 2 is the relatively long time span required for authentification, which is primarily determined by the respective data rate of the up-links i.1', i.3' and of the down-links i.2'. The main part of the authentication time is required for the transmission of the 128-bit pseudo random number PRN' as well as for the calculation of the AES128 algorithm, in particular if less efficient processors are used.

Regarding related prior art, reference is made to prior art document U.S. Pat. No. 6,549,116 B1 where a vehicle key-verifying apparatus and method with decreased verification time period feature is disclosed. However, according to this prior art document cascaded or iterative authentication is proposed.

However, the known prior art does not solve the problem of the relative long time span required for authentication.

Starting from the disadvantages and shortcomings as described above and taking the prior art as discussed into account, an object of the present invention is to further develop a communication protocol of the kind as described in the technical field, an electronic communication system of the kind as described in the technical field, as well as a method of the kind as described in the technical field in such way that the relevant time for cryptographic authentication is shortened.

The object of the present invention is achieved by a communication protocol comprising the features of claim 1, by an electronic communication system comprising the features of claim 2, as well as by a method comprising the features of claim 4. Advantageous embodiments and expedient improvements of the present invention are disclosed in the respective dependent claims.

The present invention bases on the idea of initialization, in particular pre-initialization, of the further random number in order to reduce the communication time and/or in order to reduce the calculation time during the further authentication session.

Thus, according to the present invention the time required for cryptographic authentication, in particular the communication time and/or the calculation time in symmetric cryptographic authentication, for example of at least one remote device, preferably of at least one transponder, is shortened by initializing, in particular by pre-initializing, the next random number, in particular the next or further pseudo random number, when the present random number, in particular the first or present pseudo random number, is successfully authenticated.

In particular, the present invention is based on the idea of segmenting a cryptographic challenge-and-response protocol, wherein advantageously relatively brief or short challenges, in particular relatively brief or short message authenticators and/or relatively brief or short random numbers, can be used.

One of the main ideas behind the present invention is to initialize and in particular to transmit the further random number or further challenge to be used in the further authentication session, for example in the next authentication sequence, when, in particular immediately after, finishing the first authentication session, for example the current authentication sequence.

According to a particularly inventive refinement of the present invention the random number is encrypted before transmission. Such encryption gives an additional protection against tapping of the random number and enhances the entropy of the random number generator.

According to an advantageous embodiment of the present invention the authentication is performed according to at least one second authentication stage, in particular to at least one short and/or fast authentication step, in case the further random number is transmitted and/or stored correctly, and/or to at least one first authentication stage, in particular to at least one long authentication step, for example to at least one backup authentification, in case an error occurs in transmitting and/or storing.

Independently thereof or in connection therewith, in an advantageous embodiment of the present invention, a standard algorithm, for example the advanced encryption standard protocol on 128-bit basis (AES128 standard protocol), is enhanced so as to achieve the initialization of the random number of the next authentication session or sequence when, in particular immediately after, successfully performing the authentication in the present authentication session or sequence.

This leads to the advantage that the further random number is not required to be transmitted during the time-critical cryptographic authentication step or stage. Thus, the time required for authentication of AES128 is just six milliseconds above the time required for authentication of the standard H[i]T[ag]2 algorithm, for example used for Hitag 2 sticks or for Hitag 2 transponders (with an exemplary carrier frequency of 125 Kilohertz and exemplary data rates of 3.9 Kilobit per second and of 5.2 Kilobit per second).

Moreover, according to a preferred embodiment at least one flag, in particular at least one random number available flag, is introduced in order to indicate the possibility of the second authentication stage, in particular of the short authentication sequence, to the base station. Said random number available flag is in particular set if the further random number for the next authentication session is available and is cleared or reset else.

According to a further preferred embodiment of the present invention the further random number of the further, in particular next, authentication session can be written and/or stored in at least one non-volatile memory in the base station as well as in the remote device, in particular in the transponder and/or in the smart card of the key.

This leads to the advantage that at least one first response, in particular on 96-bit basis, transmitted during the further authentication session can be completely pre-calculated in the remote device, in particular in the key, as well as in the base station, in particular in the vehicle.

The first response plays a key role in the authentication process; advantageously the authenticity or validity of the first response is checked by comparing this first response with at least one second signal being encrypted and/or decrypted by the cryptographic algorithm, in particular by AES128 based on output feedback mode (so-called OFB mode), wherein the first response and/or the authentication process is decided to be valid if the first response equals the second signal.

Moreover, a preferred embodiment of the invention is designed for performing a complete pre-calculation of at least one cipher bit of the further authentication session, in particular of the flag, preferably on 1-bit basis, and/or of at least one identifier number, preferably on 32-bit basis, and/or of at least one message authenticator, preferably on 16-bit basis, and/or of at least one configuration, preferably on 32-bit basis, and/or of the first response, preferably on 96-bit basis, at any time, in particular when and/or immediately after a successful authentication.

The present invention leads to the advantage that even if just one bit in the first response is wrong, for example in case an error occurs in pre-calculation and/or in transmission, such as in pre-calculation and/or in transmission of the first response, the further authentication process can be performed according to the first, in particular long, authentication stage, advantageously immediately after reset of the remote device, in particular after reset of the flag.

More specifically, such error case leads to a reset of the random number flag, in particular of the pseudo random number flag. Due to such error case, the transponder discontinues any further communication; the consequence is a timeout of the base station. After a reset of the transponder (being realized by disabling the magnetic field for a certain period of time), a long, not temporally accelerated authentification can be performed by the transponder.

The present invention can be applied to virtually all stream ciphers or block ciphers in order to save computing power and/or in order to save authentication time and can for example be used for car access.

Thus, the present invention finally relates to the use of at least one communication protocol as described above and/or of at least one electronic communication system as described above and/or of the method as described above for authenticating and/or for identifying and/or for checking the authority to use, to enter or the like an object to be secured, for example a transport system and/or an access system, and/or for transponder or chip card based systems, in particular for access systems, in automotive and non-automotive applications, in which systems in spite of relative low data rate the time required for authentication needs to be as low as possible, for example for electronic immobilizer systems for vehicles, in order to shorten the time required for the cryptographic authentication, more particularly in order to shorten communication time and calculation time in the cryptographic authentication.

Figure 1:
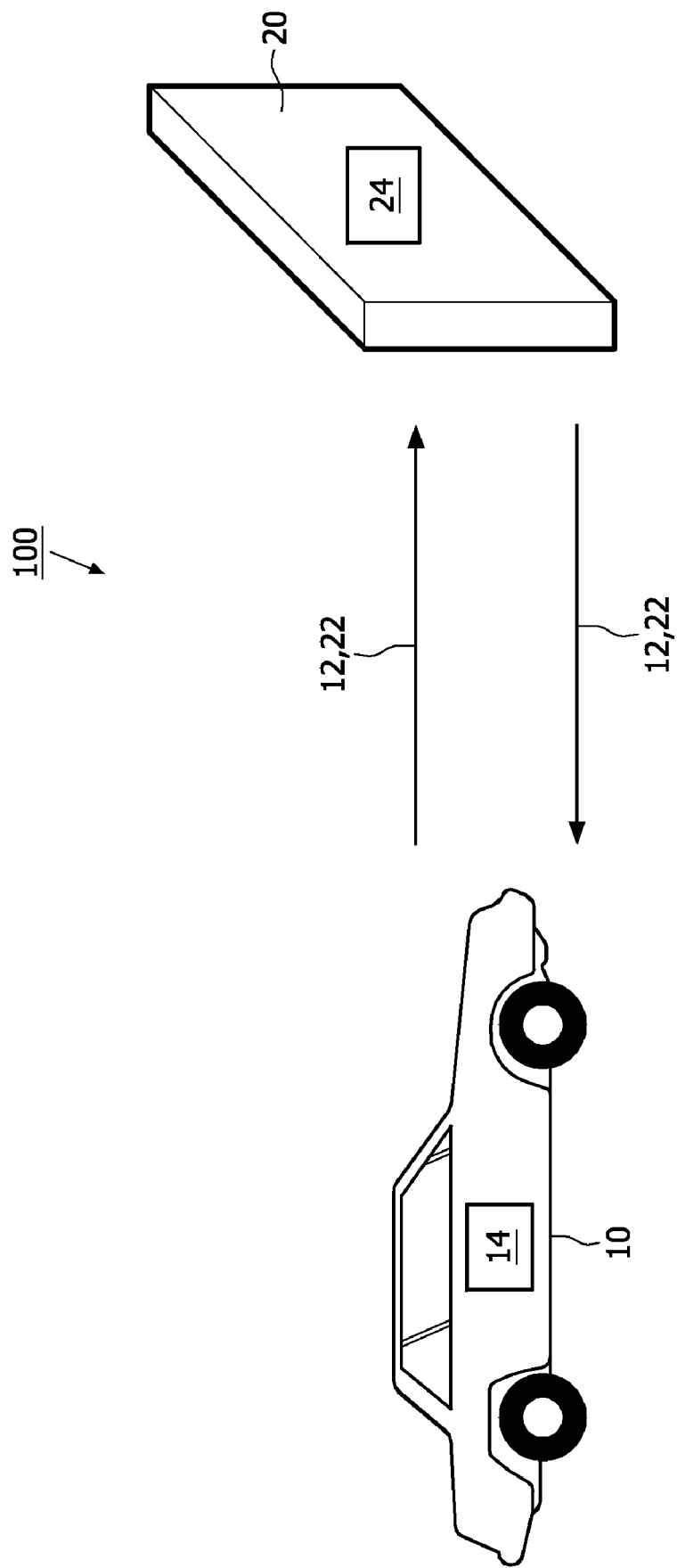
Figure 3:
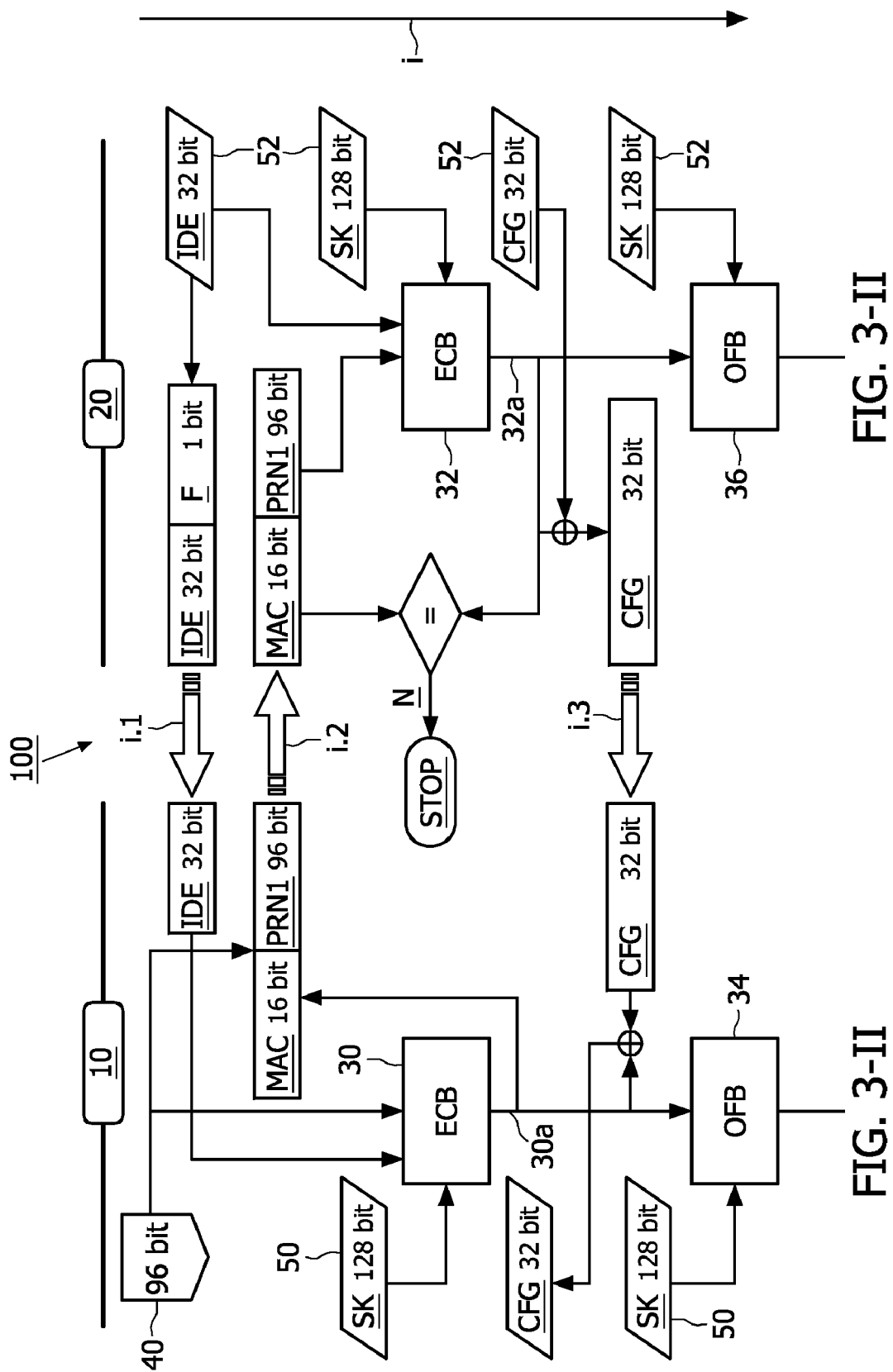

As already discussed above, there are several options to embody as well as to improve the teaching of the present invention in an advantageous manner. To this aim, reference is made to the claims respectively dependent on claim 1, on claim 2 and on claim 4; further improvements, features and advantages of the present invention are explained below in more detail with reference to a preferred embodiment by way of example and to the accompanying drawings where FIG. 1 schematically shows an embodiment of the communication system in the form of an authentication control system according to the present invention working according to the method of the present invention;

FIG. 2 schematically shows a standard implementation of the A[dvanced]E[ncryption]S[tandard] 128 crypto algorithm according to the prior art for an immobilizer application;

FIG. 3 schematically shows in more detail the function of the communication system of FIG. 1 by way of a flow process chart (first part) illustrating the method of the present invention; and FIG. 4 schematically shows in more detail the function of the communication system of FIG. 1 by way of a flow process chart (second part) illustrating the method of the present invention.

The same reference numerals are used for corresponding parts in FIGS. 1 to 4.

As shown in FIG. 1, an embodiment being implemented by means of the present invention as an electronic communication system 100 comprises, amongst other things, a remote device 20 in form of a data carrier which in turn is part of an immobilizer, in particular of a system for opening and closing the door locks of a motor vehicle. Said electronic communication system 100 is an authentication control system, further comprising a base station 10 being arranged in the motor vehicle (on the left side of FIG. 1).

The remote device 20 and the base station 10 are designed to exchange data signals 12, 22, in particular cipher bits, in which case, by means of the data signals 12, 22 the authentication for use and/or for access can be determined. To this aim the base station 10 as well as the remote device 20 comprise a respective processing/recording unit 14, 24, being provided with respective transmitting equipment and with respective receiving equipment.

In FIG. 3, the communication system 100 is described in more detail. In this context the method according to the present invention, namely the controlling of the exchange of the data signals 12, 22 is described exemplarily for the A[dvanced]E[ncryption] S[tandard]128. However, the present invention can easily be applied to almost any arbitrary, in particular symmetric encryption method or encryption process, such as to virtually all block ciphers and/or to virtually all stream ciphers.

In this context, a block cipher is a type of symmetric-key encryption algorithm transforming a fixed-length block of plaintext (=unencrypted text) data into a block of ciphertext (=encrypted text) data of the same length. This transformation takes place under the action of a user-provided secret key. Decryption is performed by applying the reverse transformation to the ciphertext block using the same secret key. The fixed length is called the block size, and for many block ciphers, the block size is 64 bits or—with processors becoming more sophisticated—128 bits.

A stream cipher is a type of symmetric encryption algorithm generating a so-called keystream, i.e. a sequence of bits used as a key. Encryption is then accomplished by combining the keystream with the plaintext, usually with the bitwise XOR operation. The generation of the keystream can be independent of the plaintext and ciphertext, yielding what is termed a synchronous stream cipher, or it can depend on the data and its encryption, in which case the stream cipher is said to be self-synchronizing. Most stream cipher designs are for synchronous stream ciphers.

While block ciphers operate on large blocks of data, stream ciphers typically operate on smaller units of plaintext, usually bits. The encryption of any particular plaintext with a block cipher results in the same ciphertext when the same key is used. With a stream cipher, the transformation of these smaller plaintext units varies, depending on when they are encountered during the encryption process.

As depicted in FIG. 3, the remote device 20 comprises a first memory 52, namely an E[lectrically]E[rasable and]P[rogrammable]R[ead]O[nly]M[emory], for providing the base station 10
- with an identifier number IDE on 32-bit basis as well as
  - with a flag F on 1-bit basis indicating if a random number, namely a first pseudo random number PRN1 or a further pseudo random number PRN2, PRN3 is available or not for a respective authentication session, namely for a first authentication session n or for a further authentication session n+1, and
- with a configuration CFG on 32-bit basis.

Moreover, said EEPROM module 52 is designed for providing a first cipher unit 32 of the remote device 20 with a secret key SK on 128-bit basis wherein the first cipher unit 32 is operated on electronic codebook mode (so-called ECB mode), which is a special AES mode.

Furthermore, the EEPROM module 52 is designed for providing a second cipher unit 36 of the remote device 20 with a secret key SK on 128-bit basis wherein the second cipher unit 36 is operated on output feedback mode (so-called OFB mode), which again is a special AES mode.

The second cipher unit 36 in turn is designed for providing the base station 10
- with a first response RSP1 on 96-bit basis as well as
- with an encrypted second response RSP2b, namely the encrypted instruction to write and verify ok.

Finally, the remote device 20 comprises a second memory 56, in particular a non-volatile memory, namely a write EEPROM or WEEPROM, for storing the further random number PRN2, PRN3 of the next authentication session n+1 after successfully performing the authentication in the present session n.

For generating the pseudo random numbers PRN1, PRN2, PRN3 on 96-bit basis the base station 10 comprises a random number generator 40.

Moreover, the base station 10 comprises a first memory module 50, namely an EEPROM, for providing a first cipher unit 30 and a second cipher unit 34 with a secret key SK on 128-bit basis wherein both cipher units 30, 34 are arranged at the base station 10.

The first cipher unit 30 is operated by AES128 based on ECB mode and designed for providing the remote device 20 with a message authenticator MAC on 16-bit basis. The second cipher unit 34 of the base station 10 is operated by AES128 based on OFB mode.

The base station 10 further comprises a second memory module 54, in particular a non-volatile memory, namely a write EEPROM or WEEPROM, for storing the further random number PRN2, PRN3 of the next authentication session n+1 after successfully performing the authentication in the present authentication session n.

All in all, FIG. 3 depicts a first or long authentication stage or step i, namely a backup authentication in case of no error detection. The long authentication stage or start authentication stage i is performed if no pseudo random number PRN1 or PRN2, PRN3 for the respective authentication session n or n+1 is available.

FIG. 3 further depicts a stage or step of initialization p, in particular of pre-initialization, of the further random number PRN2 for the next authentication session n+1.

The initialization or pre-initialization p of the further pseudo random number PRN2 can be performed at any time after the time-critical authentication or authentification is finished. Moreover, the initialization p of the further pseudo random number PRN2 can be arbitrarily secured or safeguarded, for instance by a cyclic redundancy check or by an error correction.

In more detail, the backup authentication i comprises the following steps i.1, i.2, i.3, i.4:
- i.1: First, the identifier number IDE on 32-bit basis and the flag F on 1-bit basis indicating that no first pseudo random number PRN1 is available are transmitted from the remote device 20 to the base station 10, in particular to the first cipher unit 30 being processed on electronic codebook mode (so-called ECB mode).

The first cipher unit 30
  is further provided
  - with the first pseudo random number PRN1 on 96-bit basis being provided by the random number generator 40 and
  - with the secret key SK on 128-bit basis and outputs (=reference numeral 30a) the message authenticator MAC on 16-bit basis.

i.2: Thereupon, the first random number PRN1 on 96-bit basis and the message authenticator MAC on 16-bit basis are transmitted from the base station 10 to the remote device 20.

In the remote device 20, the authenticity or validity of the first random number PRN1 and of the message authenticator MAC is checked by comparing the message authenticator MAC with the output 32a of the first cipher unit 32 of the remote device 20, wherein the first cipher unit 32 is processed on electronic codebook mode (so-called ECB mode) and is provided with the identifier number IDE on 32-bit basis,
with the first pseudo random number PRN1 on 96-bit basis, and
with the secret key SK on 128-bit basis.

If the message authenticator MAC does not equal (=reference numeral N in FIG. 3) the output 32a of the first cipher unit 32, then the authentication process is stopped.

i.3: If the message authenticator MAC equals the output 32a of the first cipher unit 32 of the remote device 20, then a configuration CFG on 32-bit basis is transmitted from the remote device 20 to the base station 10, wherein before transmission the configuration CFG is processed with, in particular added to, the output 32a of the first cipher unit 32 of the remote device 20.

Thereupon, the configuration CFG is processed with, in particular added to, the output 30a of the first cipher unit 30 of the base station 10; the second cipher unit 34 of the base station 10 being operated on output feedback mode (so-called OFB mode) is provided with the output signal 30a of the first cipher unit 30 of the base station 10 and with the secret key SK on 128-bit basis.

Moreover, the second cipher unit 36 of the remote device 20 being operated on OFB mode is provided with the output signal 32a of the first cipher unit 32 of the remote device 20 and with the secret key SK on 128-bit basis.

i.4: Thereupon, a first response RSP1 on 96-bit basis comprising a first output signal 36a of the second cipher unit 36 of the remote device 20 is transmitted to the base station 10.

i.4.1: In the base station 10, the authenticity or validity of the first response RSP1 is checked by comparing said first response RSP1 with a first output signal 34a of the second cipher unit 34 of the base station 10.

i.4.2: The first response RSP1 and/or the whole authentication process is decided to be valid (=reference numeral V in FIG. 3) if the first response RSP1 equals (=reference numeral Y in FIG. 3) the first output signal 34a of the second cipher unit 34 of the base station 10.

After successful authentication, the initialization p of the further pseudo random number PRN2 for the next authentication session n+1 is performed. This stage or step of initialization p comprises the following steps p.0, p.1, p.2:

p.0: First, the further pseudo random number PRN2 is provided on 96-bit basis by the random number generator 40 of the base station 10. After this, the further pseudo random number PRN2 is processed with, in particular added to, a second output signal 34b of the second cipher unit 34 of the base station 10. For transmission, the further pseudo random number PRN2 can optionally be encrypted.

p.1: Thereupon, the optionally encrypted further random number PRN2 is transmitted to the remote device 20 and processed with, in particular added to, a second output signal 36b of the second cipher unit 36 of the remote device 20.

p.1.1: Afterwards, the further random number PRN2 is stored on the non-volatile memory module 56, namely on the write EEPROM or WEEPROM, of the remote device 20. In case of the further random number PRN2 having been transmitted in an encrypted manner, said further random number PRN2 is decrypted before writing on the memory module 56.

p.1.2: The providing of the unencrypted or plain further random number PRN2 initiates that the flag F is set to indicate that the further random number PRN2 is available for the next authentication session n+1.

Thereupon, a second response RSP2a, namely the instruction to write the further random number PRN2 and to verify the further random number PRN2, is provided in an unencrypted or plain manner on arbitrary-bit basis (=reference numeral XXX in FIG. 3).

A third output signal 36c of the second cipher unit 36 of the remote device 20 is processed with, in particular added to, the second response RSP2a, whereupon the resulting second response RSP2a is encrypted thus forming the encrypted second response RSP2b.

p.2: Finally, said encrypted second response RSP2b is transmitted to the base station 10.

p.2.1: In the base station 10, the second response RSP2b is decrypted thus forming the decrypted or plain second response RSP2a; the authenticity or validity of the further random number PRN2 is checked by comparing said decrypted or plain second response RSP2a with a third output signal 34c of the second cipher unit 34 of the base station 10, wherein the further random number PRN2 is valid (=reference numeral V in FIG. 3) if the second response RSP2a equals (=reference numeral Y in FIG. 3) the third output signal 34c of the second cipher unit 34.

p.2.2: If the further random number PRN2 is valid, then the plain or unencrypted further random number PRN2 is written or stored on the write EEPROM module or WEEPROM module 54 of the base station 10.

p.2.3: Otherwise, i.e. if the further random number PRN2 is not valid, initialization step p.1 of transmitting the further random number PRN2 is repeated.

If the further random number PRN2 for the second authentication session n+1 is available, i.e. if the first authentification step i and the initialization step p of the further pseudo random number PRN2 were successful, then for the next authentification session n+1 a second authentication stage ii, namely a short and fast authentication step, can be chosen.

In case an error or the like occurred during the transmission of the further pseudo random number PRN2, such problem can be detected already after processing the first bits of the message authenticator MAC in the remote device 20 (cf. step ii.2 below). In this case of error in the transmission of the further random number PRN2, the remote device 20 does not answer anymore and an authentication according to the first authentication step i (cf. FIG. 3) can be started.

This is a backup solution without an adverse effect on the security. However, if sufficient security arrangements, such as cyclic redundancy check, resend, etc., are assumed for the initialization stage i, the described backup almost never is necessary.

The short and fast authentication process ii comprising the following steps ii.1, ii.2, ii.3, ii.4 is depicted in more detail in FIG. 4:

ii.1: First, the identifier number IDE on 32-bit basis and the flag F on 1-bit basis indicating that the further random number PRN2 is available are transmitted from the remote device 20 to the base station 10.

ii.2: Thereupon, the message authenticator MAC on 16-bit basis is transmitted whereupon ii.2.1: the authenticity or validity of the further random number PRN2 and/or of the message authenticator MAC is checked by comparing the message authenticator MAC with the first output signal 32a of the first cipher unit 32 of the remote device 20; if the message authenticator MAC does not equal (=reference numeral N in FIG. 4) the first output signal 32a of the first cipher unit 32 of the remote device 20, in particular in case of an error occurring in transmitting (=reference numeral i.4, p.1, ii.2) or in storing (=reference numeral p.1.1) the further random number PRN2 and/or the message authenticator MAC, the second authentication stage ii is stopped and the first authentication stage i is performed, and ii.2.2: the flag F indicating that the pseudo random number PRN2 for the next authentication session n+1 is available is reset.

ii.3: If the message authenticator MAC equals the first output signal 32a of the first cipher unit 32 of the remote device 20, the configuration CFG on 32-bit basis is transmitted form the remote device 20 to the base station 10.

ii.4: Thereupon, the first response RSP1 is transmitted from the remote device 20 to the base station 10. The authenticity or validity of the first response RSP1 is checked as described above (cf. description to FIG. 3).

After the short and fast authentication step ii is performed successfully, the further pseudo random number PRN3 for the in turn next authentication session n+2 is initialized (=reference numeral p) as described above.

LIST OF REFERENCE NUMERALS 100 electronic communication system, in particular authentication control system
100' electronic communication system according to prior art (cf. FIG. 2)
10 base station, in particular main unit, for example vehicle
10' base station, in particular main unit, for example vehicle, according to prior art (cf. FIG. 2)
12 data signal, in particular first signal, for example downlink, being sent by the base station 10 and/or being retransmitted by the remote device 20
14 processing/recording unit of base station 10, in particular with transmitting means and/or with receiving means
20 remote device, in particular transponder station, for example data carrier, more specifically smart card of key fob
20' remote device, in particular transponder station, for example data carrier, more specifically smart card of key fob, according to prior art (cf. FIG. 2)
22 data signal, in particular second signal, for example up-link, being sent by the remote device 20
24 processing/recording unit of remote device 20, in particular with transmitting means and/or with receiving means
30 first cipher unit of base station 10, in particular operated by AES128 based on ECB mode
30' cipher unit of base station 10' according to prior art based on ECB mode (cf. FIG. 2)
30a output of first cipher unit 30 of base station 10, in particular signal being encrypted and/or decrypted by a cryptographic algorithm, in particular by AES128 based on ECB mode
30a' output of cipher unit 30' of base station 10' according to prior art based on ECB mode (cf. FIG. 2)
32 first cipher unit of remote device 20, in particular operated by AES128 based on ECB mode
32' cipher unit of remote device 20' according to prior art based on ECB mode (cf. FIG. 2)
32a output of first cipher unit 32 of remote device 20, in particular signal being encrypted and/or decrypted by a cryptographic algorithm, in particular by AES128 based on ECB mode
34 second cipher unit of base station 10, in particular operated by AES128 based on OFB mode
34a first output of second cipher unit 34 of base station 10, in particular first signal being encrypted and/or decrypted by the cryptographic algorithm, for example by AES128 based on OFB mode
34b second output of second cipher unit 34 of base station 10, in particular second signal being encrypted and/or decrypted by the cryptographic algorithm, for example by AES128 based on OFB mode
34c third output of second cipher unit 34 of base station 10, in particular third signal being encrypted and/or decrypted by the cryptographic algorithm, for example by AES128 based on OFB mode
36 second cipher unit of remote device 20, in particular operated by AES128 based on OFB mode
36a first output of second cipher unit 36 of remote device 20, in particular first signal being encrypted and/or decrypted by the cryptographic algorithm, for example by AES128 based on OFB mode
36b second output of second cipher unit 36 of remote device 20, in particular second signal being encrypted and/or decrypted by the cryptographic algorithm, for example by AES128 based on OFB mode
36c third output of second cipher unit 36 of remote device 20, in particular third signal being encrypted and/or decrypted by the cryptographic algorithm, for example by AES128 based on OFB mode
40 random number generator, in particular pseudo random number generator, for example on 96-bit basis
40' pseudo random number generator on 128-bit basis according to prior art (cf. FIG. 2)
50 first memory unit of base station 10, in particular E[lectrically]E[rasable and]P[rogrammable]R[ead] O[nly]M[emory]
50' E[lectrically]E[rasable and]P[rogrammable]R[ead] O[nly]M[emory] of base station 10' according to prior art (cf. FIG. 2)
52 first memory unit of remote device 20, in particular E[lectrically]E[rasable and]P[rogrammable]R[ead]O[nly]M[emory]
52' E[lectrically]E[rasable and]P[rogrammable]R[ead] O[nly]M[emory] of remote device 20' according to prior art (cf. FIG. 2)
54 second memory unit of base station 10, in particular non-volatile memory, for example W[rite]E[lectrically]E[rasable and]P[rogrammable]R[ead] O[nly]M[emory]
56 second memory unit of remote device 20, in particular non-volatile memory, for example W[rite]E[lectrically]E[rasable and]P[rogrammable]R[ead] O[nly]M[emory]
AES advanced encryption standard
AES128 advanced encryption standard on 128-bit basis
CFG configuration ECB electronic codebook
ECB mode first special AES mode, in particular electronic codebook mode
F flag, in particular on 1-bit basis, indicating if the first random number PRN1 and/or the further random number PRN2, PRN3 is and/or are available
IDE identifier number, in particular serial number, preferably on 32-bit basis
i first authentication stage, in particular long authentication stage, for example backup authentication stage
i.1 first step of first authentication stage i, in particular up-link of identifier number IDE from remote device 20 to base station 10
i.1' first authentication stage or first authentication step, in particular up-link of identifier number IDE from remote device 20' to base station 10', according to prior art (cf. FIG. 2)
i.2 second step of first authentication stage i, in particular down-link of message authenticator MAC and/or of first random number PRN1 from base station 10 to remote device 20
i.2' second authentication stage or second authentication step, in particular down-link of random number PRN' from base station 10' to remote device 20', according to prior art (cf. FIG. 2)
i.3 third step of first authentication stage i, in particular up-link of configuration CFG from remote device 20 to base station 10
i.4 fourth step of first authentication stage i, in particular up-link of first response RSP1 from remote device 20 to base station 10
ii second authentication stage, in particular short and/or fast authentication stage, for example post initialization authentication
ii.1 first step of second authentication stage ii, in particular up-link of identifier number IDE from remote device 20 to base station 10
ii.2 second step of second authentication stage ii, in particular down-link of message authenticator MAC from base station 10 to remote device 20
ii.3 third step of second authentication stage ii, in particular up-link of configuration CFG from remote device 20 to base station 10
ii.4 fourth step of second authentication stage ii, in particular up-link of first response RSP1 from remote device 20 to base station 10
MAC message authenticator, in particular on 16-bit basis
n first authentication session or first authentication sequence, in particular present authentication session or present authentication sequence
n+1 further authentication session or further authentication sequence, in particular first further authentication session or first further authentication sequence
n+2 further authentication session or further authentication sequence, in particular second further authentication session or second further authentication sequence
N no
OFB output feedback
OFB mode second special AES mode, in particular output feedback mode
p initialization stage, in particular pre-initialization stage, of further random number PRN2, PRN3
p.1 first step of initialization stage p, in particular down-link of further random number PRN2, PRN3 from base station 10 to remote device 20
p.2 second step of initialization stage p, in particular up-link of second response RSP2*a*, RSP2*b* from base station 10 to remote device 20
PRN' random number, in particular pseudo random number, on 128-bit basis according to prior art (cf. FIG. 2)
PRN1 first random number, in particular pseudo random number for first authentication session or for first authentication sequence n, for example on 96-bit basis
PRN2 further random number, in particular pseudo random number for first further authentication session or for first further authentication sequence n+1, for example on 96-bit basis
PRN3 further random number, in particular pseudo random number for second further authentication session or for second further authentication sequence n+2, for example on 96-bit basis
RSP' response, in particular on 128-bit basis, from remote device 20' to base station 10' according to prior art (cf. FIG. 2)
RSP1 first response, in particular on 96-bit basis, from remote device 20 to base station 10
RSP2*a* plain or unencrypted second response, in particular instruction to write and verify ok
RSP2*b* encrypted second response, in particular instruction to write and verify ok, transmitted from remote device 20 to base station 10
SK secret key, in particular on 128-bit mode
V valid
XXX bit arbitrary-bit basis
Y yes

The invention claimed is:

1. An electronic communication system, comprising:
a base station arranged to be secured against unauthorized use and
a remote device configured to exchange cipher data bits, with the base station to perform authentication by:
provide a first pseudo random number for a first authentication session; and
in response to successfully performing authentication in the first authentication session providing a second pseudo random number for a second authentication session; and
wherein the communication system further includes:
at least one random number generator being at least one of arranged at the base station, and being designed for generating the random numbers on 96-bit basis;
at least one first memory for providing the base station with at least one of an identifier number on a 32-bit basis, and at least one first cipher unit and at least one second cipher unit with at least one secret key on 128-bit basis, and
for providing the base station with at least one configuration on 32-bit basis; and
at least one second memory for storing the further random number at least one of the base station and the remote device; and
wherein:
the first cipher unit is arranged at, at least one of the base station and the remote device, and the first cipher unit being designed for providing the remote device with at least one message authenticator-16-bit basis, the first cipher unit being operated by AES128 based on electronic codebook mode;
the second cipher unit is arranged at, at least one of the base station and the remote device, and the second cipher unit being designed for providing the base station with at least one first response, on 96-bit basis and at least one encrypted second response with at least one instruction;

the second cipher unit being further arranged to write the further random number on the second memory and to check the authenticity of the further random number by comparing the second response with the output of the second cipher unit of the base station, wherein the further random number is written if the second response equals the output of the second cipher unit; and the second cipher unit being operated by AES128 based on at least one second AES mode based on output feedback mode.

2. A method for Advanced Encryption Standard AES 128 cryptographic authentication, comprising:

performing a first authentication session between a base station and a remote device by performing steps including:

at least one identifier number is transmitted, on a 32 bit basis, with at least one flag, on 1-bit basis, the flag indicating if a first random number is available, after the first random number in particular on 96-bit basis, having been provided, said first random number and at least one message authenticator, are transmitted, on a 16 bit basis, whereupon the authenticity of at least one of the first random number and the message authenticator is checked by comparing the message authenticator with at least one first output signal of at least one first cipher unit of the remote device, said first cipher unit of the remote device having been provided with the first random number, transmitting at least one configuration, on a 32 bit basis, if at least one of the first random number and the message authenticator equals the first output signal, transmitting at least one first response, on a 96 bit basis, whereupon the authenticity of the first response is checked by comparing said first response with at least one first output signal of at least one second cipher unit of the base station, said second cipher unit of the base station being operated by AES128 based on at least one second AES mode, based on output feedback mode, and being provided with at least one output signal of at least one first cipher unit of the base station, and at least one of the first response and the cryptographic authentication is decided to be valid if the first response equals said first output signal of the second cipher unit of the base station; and in response to successfully performing authentication in the first authentication session, performing a further authentication session with a further pseudo-random number.

3. A method for Advanced Encryption Standard AES 128 cryptographic authentication, comprising:

performing a first authentication session between a base station and a remote device; and in response to successfully performing authentication in the first authentication session, performing a further authentication session with a further pseudo-random number by performing the steps of:

in response to the further random number having been provided, transmitting said further random number in an encrypted manner;

storing the further random number in at least one second non-volatile memory of the remote device;

setting the flag to indicate that the further random number is available for one of a further authentication sequence and a further authentication session; and transmitting at least one encrypted second response, whereupon the authenticity of the further random number is checked by comparing said second response with at least one third output signal of the second cipher unit of the base station, the further random number being valid if the second response equals the third output signal of the second cipher unit; and in response to the further random number being valid, storing the further random number in at least one second non-volatile memory of the base station; and in response to the further random number not being valid repeating the further authentication steps.

4. The method according to claim 2, second authentication stage ii includes the steps:

transmitting the identifier number with the flag, transmitting the message authenticator, whereupon the authenticity or validity of the further random number and/or of the message authenticator is checked by comparing the message authenticator with the first output signal of the first cipher unit of the remote device;

in response to the message authenticator does being equal to the first output signal of the first cipher unit of the remote device, stopping the second authentication stage performing the first authentication stage, and resetting the flag indicating that the further random number is available for the further authentication sequence or authentication session; and, in response to the message authenticator equals the first output signal of the first cipher unit of the remote device, transmitting the configuration and the first response, whereupon the authenticity or validity of the first response is checked by comparing said first response with the first output signal of the second cipher unit of the base station and the first response and/or the cryptographic authentication is decided to be valid if the first response equals said first output signal of the second cipher unit of the base station.

5. The method according to claim 2, wherein performing the second authentication stage ii is contingent on the value indicated to the base station by the flag.

6. The method according to claim 2, characterized by performing a complete pre-calculation of the data signals, in particular of the cipher bits, of the further authentication sequence or authentication session immediately after successfully performing the cryptographic authentication in the first authentication sequence or authentication session.

7. The method according to claim 2 for checking the authority to use, to enter or the like an object to be secured, and/or for transponder or chip card based access systems.

8. A method for cryptographic authentication, comprising: performing a first authentication session between a base station and a remote device including: transmitting a identifier number with at least one flag from the remote device to base station, the flag indicating if the either of a first and a second random number is available; transmitting a first pseudo random number and a message authenticator from the base station to the remote device; authenticating the first pseudo random number by: processing the first random number with a first cipher unit of the remote device to produce a first output signal; and comparing the message authenticator with the first output signal, the first random number being authenticated if the first response equals the first output signal; in response to authenticating the first pseudo random number: transmitting a configuration message from the remote device to the base station; and transmitting the first response from the remote device to the base station; and authenticating the first response in the base station by: processing the message authentication and cryptographic key with a cipher unit of the base station to produce a second output signal; and comparing the first response with the second output signal, the first response being authenticated if the first response equals the second output signal; and in response to successfully performing authentication in the first authentication session, performing a second authentication session with a second pseudo-random number.

9. A method for cryptographic authentication, characterized by the stage of initialization, of the further random number, the method comprising:
- transmitting a first pseudo random number from a base station to a remote device, for a first authentication session, and
- in response to successfully performing authentication in the first authentication session, performing a second authentication session including:
- transmitting a second pseudo random number in an encrypted form from the base station to the remote device
- decrypting and storing the second pseudo random number in a non-volatile memory of the remote device
- setting a flag to indicate that the second pseudo random number is available for the for the second authentication session; and
- transmitting an encrypted response from the remote device to the base station;
- authenticating the second pseudo random number in the base station by:
- decrypting the encrypted response; and
- comparing the response with an output signal of a cipher unit of the base station, the second pseudo random number being valid if the second response equals the output signal of the cipher unit;
- in response to authenticating the second pseudo random number, storing the second pseudo random number in a non-volatile memory of the base station; and
- in response to the second random number being invalid, repeating the steps of the second authentication session.

10. The method according to claim 8, wherein the second authentication stage includes the steps:
- transmitting the identifier number and the flag from the remote device to the base station;
- transmitting the message authenticator from the base station to the remote device;
- authenticating a second pseudo random number by comparing the message authenticator with an output of the first cipher unit of the remote device;
- in response to a discrepancy between the message authenticator and the output of the first cipher unit of the remote device, storing the second pseudo random number, resetting the flag indicating the availability of the second pseudo random number, and repeating the first authentication stage; and
- in response to authenticating the second pseudo random number, transmitting the configuration and the first response of the second authentication session from the remote device to the base station, and authenticating the first response by comparing an output of the cipher unit of the base station with the first response, the first response being valid if the first response equals the output of the cipher unit of the base station.

* * * * *